(12) United States Patent
Masuda (10) Patent No.: US 12,359,965 B2
(45) Date of Patent: Jul. 15, 2025

(54) OPTICAL MEASURING DEVICE, OPTICAL MEASURING METHOD, DATA PROCESSING DEVICE, AND PROGRAM

(71) Applicant: Konica Minolta Inc., Tokyo (JP)

(72) Inventor: Satoshi Masuda, Neyagawa (JP)

(73) Assignee: Konica Minolta, Inc., Tokyo (JP)

( * ) Notice: Subject to any disclaimer, the term of this patent is extended or adjusted under 35 U.S.C. 154(b) by 482 days.

(21) Appl. No.: 17/871,706

(22) Filed: Jul. 22, 2022

(65) Prior Publication Data

US 2023/0033014 A1 Feb. 2, 2023

(30) Foreign Application Priority Data

Jul. 27, 2021 (JP) .................. 2021-122738

(51) Int. Cl.
*G01J 1/30* (2006.01)
*G01J 1/44* (2006.01)
*G09G 5/10* (2006.01)

(52) U.S. Cl.
CPC . *G01J 1/30* (2013.01); *G01J 1/44* (2013.01); *G09G 5/10* (2013.01); *G09G 2320/0247* (2013.01); *G09G 2360/145* (2013.01)

(58) Field of Classification Search
CPC .... G01J 1/0228; G01J 1/44; G01J 1/30; G01J 2001/4252; G01J 2001/4247; G01J 2001/4426; G09G 3/006; G09G 2320/0247; G09G 5/10; G09G 2360/145
See application file for complete search history.

(56) References Cited

U.S. PATENT DOCUMENTS

2003/0132904 A1 7/2003 Goyins

FOREIGN PATENT DOCUMENTS

| JP | 2004317450 A | 11/2004 | |
|----|----|----|----|
| JP | 2006038762 A | 2/2006 | |
| KR | 20190133030 A | 11/2019 | |
| WO | WO-2009040705 A2 * | 2/2009 | ......... H05B 33/0803 |
| WO | 2017038675 A1 | 3/2017 | |
| WO | 2018198674 A1 | 11/2018 | |

OTHER PUBLICATIONS

English Translation WO 2017038675 (Year: 2009).*
Korean Office Action (KROA) dated Jul. 31, 2024 for Korean Patent Application No. 10-2022-0090544; English translation.
(Continued)

*Primary Examiner* — An H Do
(74) *Attorney, Agent, or Firm* — RANKIN, HILL & CLARK LLP (57) ABSTRACT

An optical measuring device includes: a stimulus value acquirer that receives light from a measurement target and continuously acquires intensity corresponding to a stimulus value at a regular time interval; a response characteristic acquirer that acquires an impulse response characteristic from a storage that stores the impulse response characteristic corresponding to a luminous stimulus response; and a hardware processor that performs digital filter processing on continuous data of stimulus value intensity acquired by the stimulus value acquirer by the impulse response characteristic acquired by the response characteristic acquirer to generate data on which the luminous stimulus response is superimposed.

33 Claims, 6 Drawing Sheets

(56) References Cited

OTHER PUBLICATIONS

Japanese Office Action (JPOA) dated Oct. 16, 2024 issued for Japanese patent application No. 2021-122738 and its English machine translation.
Bedell He et al., "The temporal impulse response function in infantile nystagmus", Vision research, 2008, vol. 48, No. 15, pp. 1575-1583; Cited in JPOA.
"Organic light emitting diode (OLED) displays—Part 6-3: Measuring methods of image quality," IEC International Standard, 2017, p. 1-6, edition 2.0, International Electrotechnical Commission.

* cited by examiner

OPTICAL MEASURING DEVICE, OPTICAL MEASURING METHOD, DATA PROCESSING DEVICE, AND PROGRAM

The entire disclosure of Japanese patent Application No. 2021-122738, filed on Jul. 27, 2021, is incorporated herein by reference in its entirety.

BACKGROUND

Technological Field

The present invention relates to an optical measuring device, an optical measuring method, a data processing device, and a program suitable for measuring flicker and the like of a measurement target such as a display.

Description of the Related Art

With improvement in function and performance of a display, a light emission waveform becomes complicated. Light emission having a high-amplitude and complicated waveform is generalized; for example, in a case of an organic light-emitting diode (OLED) display, light emission control in which not only amplitude modulation but also pulse width modulation is combined with gradation control is adopted in order to implement accurate color reproduction.

In recent years, a display having a variable refresh rate (VRR) function has been developed, and in this display, a refresh rate is dynamically and aperiodically switched, so that a transient response is observed in the light emission waveform with a switching point as a starting point; in this manner, the light emission waveform is increasingly complicated.

As the light emission waveform becomes complicated, flicker (visible flicker) becomes apparent. This becomes a problem in quality of the display.

As an optical measuring device that measures basic performance of a measurement target such as a display, for example, a display color analyzer (for example, CA-410 manufactured by KONICA MINOLTA, INC.) is known. Such display color analyzer includes an optical sensor therein, and may measure not only color and luminance but also an optical waveform and flicker.

There are roughly two types of methods for acquiring a light amount from the measurement target; that is, a sequential acquisition method for acquiring an instantaneous value, and an integral acquisition method for acquiring an integral value in a predetermined time. While the sequential acquisition method is excellent in high speed performance, the integration method is excellent in low luminance measurement performance.

As a method of measuring flicker occurring in the display and the like, a JEITA method is common. However, although a simple light emission waveform in a liquid crystal (LCD) and the like may be effectively measured by this method, this is not suitable for a complicated waveform because a measurement value does not conform to visual observation.

Therefore, as a measuring method for the complicated light emission waveform, there is a method defined in the IEC standard "62341-6-3".

In this standard, a stimulus value in consideration of a time response of an eye is derived by performing convolution of a temporal contrast sensitivity function (TCSF) indicating a sensitivity characteristic of the eye with respect to a light emission frequency for an acquired continuous stimulus value, and a flicker index is derived from the stimulus value.

A specific procedure is as follows. (1) A stimulus value of a display that emits light is continuously acquired. (2) Acquired data is subjected to discrete Fourier transform (DFT) processing to be transformed into a frequency spectrum. (3) The acquired frequency spectrum is subjected to convolution operation with TCSF to superimpose a characteristic of an eye. (4) Inverse Fourier transform (iDFT) processing is performed to generate a stimulus value on which TCSF is superimposed. (5) (Maximum value (Max)–minimum value (Min)/average value (Ave) of the stimulus value data on which TCSF is superimposed is calculated to index a flicker amount.

However, the digital Fourier transform (DFT, iDFT) is an operation on the assumption that an input waveform has periodicity and synchronized. Since this digital Fourier transform is incorporated into the flicker measuring method, there are the following problems.

That is, for example, in a case where a measurement time does not match a cycle (for example, a Vsync period) of the light emission waveform (not an integral multiple), light amount values of a leading end and a trailing end of the acquired waveform do not conform.

In the frequency spectrum of such waveform, many false frequency components (=1/measurement time×n, that is, the frequency with the measurement time as one cycle and its harmonic wave) that do not originally exist are generated.

A superimposed waveform of this frequency spectrum has a problem that a leading end and a trailing end are greatly distorted, and as a result, a large error occurs in a flicker value, and the measurement lacks reproducibility.

As a countermeasure against this, a method of deleting the leading end and the trailing end of acquired data to ensure synchronization is proposed. However, this method not only takes time and effort, but also possibly cannot acquire data of a desired measurement time length due to the data deletion, and it is not convenient for the flicker measurement. It is not possible to cope with an aperiodic light emission waveform such as the light emission waveform of the display having the VRR function described above.

Furthermore, as another countermeasure different from synchronization, a method of using a window function that transforms data ends into the same value is disclosed. In this method, the acquired waveform is first multiplied by the window function, the TCSF is superimposed on the waveform by a similar method, and the window function is divided at the end to create a desired waveform. However, also in this method, there is a problem that the error at the time of waveform acquisition is extended when the window function is divided, and as a result, the waveform is greatly distorted, thereby causing a large error in the flicker value.

SUMMARY

The present invention is achieved in view of such a technical background, and an object thereof is to provide an optical measuring device, an optical measuring method, a data processing device, and a program capable of generating data in which waveform distortion is suppressed even though the data is data of a stimulus value in consideration of a time response of an eye, eventually enabling excellent flicker measurement, and capable of coping with a measurement target having an aperiodic light emission waveform.

To achieve the abovementioned object, according to an aspect of the present invention, an optical measuring device reflecting one aspect of the present invention comprises:

a stimulus value acquirer that receives light from a measurement target and continuously acquires intensity corresponding to a stimulus value at a regular time interval;

a response characteristic acquirer that acquires an impulse response characteristic from a storage that stores the impulse response characteristic corresponding to a luminous stimulus response; and a hardware processor that performs digital filter processing on continuous data of stimulus value intensity acquired by the stimulus value acquirer by the impulse response characteristic acquired by the response characteristic acquirer to generate data on which the luminous stimulus response is superimposed.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

First Embodiment

Configuration of Optical Measuring Device

Figure 1:
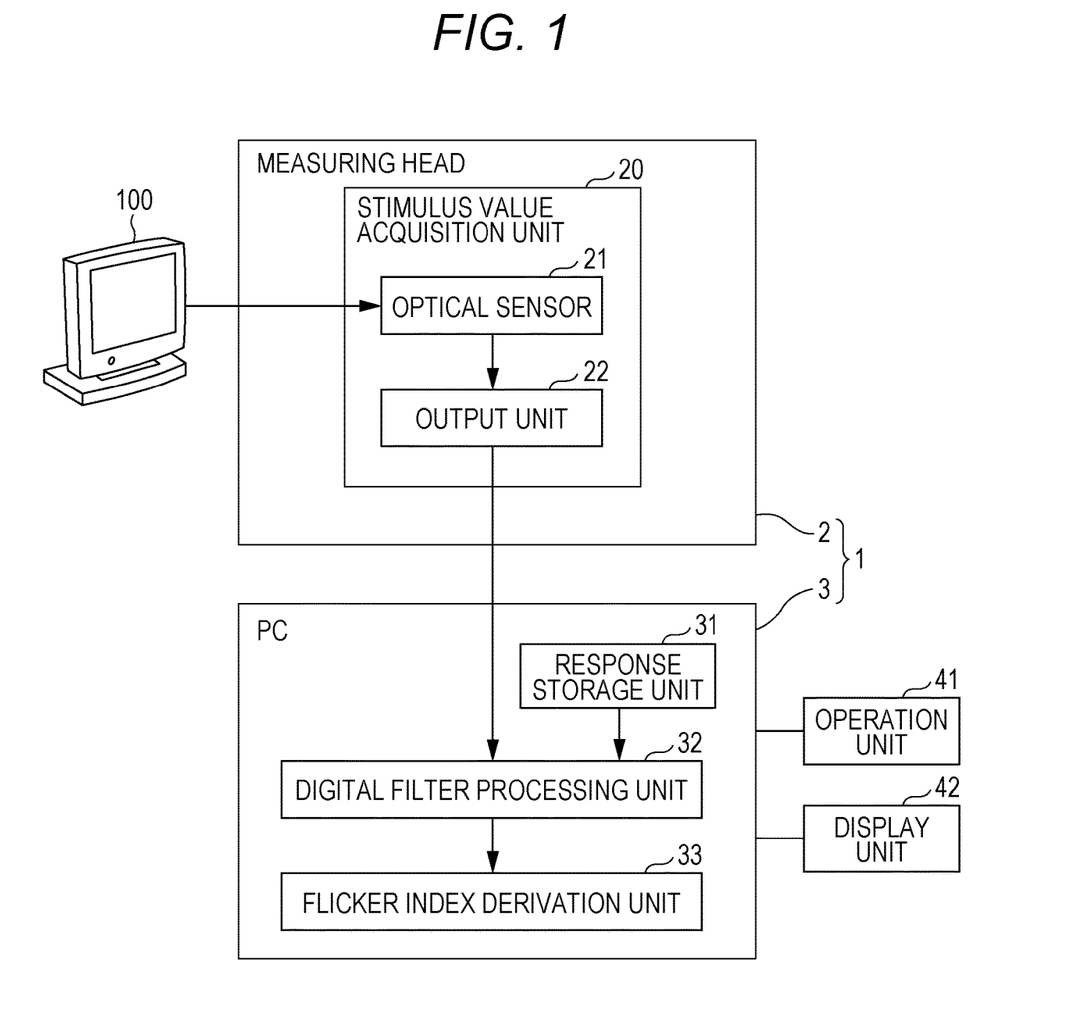
FIG. 1 is a block diagram illustrating a functional configuration of an optical measuring device according to an embodiment of the present invention.

FIG. 1 is a block diagram illustrating a functional configuration of an optical measuring device 1 according to an embodiment of the present invention. As illustrated in FIG. 1, the optical measuring device 1 is provided with a measuring head 2 and a data processing device 3. The measuring head 2 is provided with an optical sensor 21 and an output unit 22 that form a stimulus value acquisition unit 20, and the data processing device 3 is formed of a personal computer (PC) and provided with a response storage unit 31, a digital filter processing unit 32, and a flicker index derivation unit 33. Note that, reference numeral 41 in FIG. 1 represents an operation unit that operates the data processing device 3, and reference numeral 42 represents a display unit that displays a digital filter processing result by the digital filter processing unit 32, a flicker index derived by the flicker index derivation unit 33 and the like.

The optical sensor 21 is a light receiving sensor that receives light emitted from a measurement target 100 such as a display, and the stimulus value acquisition unit 20 has a function of continuously acquiring an output of the optical sensor 21 at a regular time interval by the output unit 22 and transforming the same into continuous data of stimulus value intensity.

The optical sensor 21 may be of a tristimulus value direct reading type or a spectral type. A stimulus value to be transformed includes, for example, luminance, chromaticity (xy), tristimulus values represented by XYZ and the like. In continuous data transformation of the stimulus value, filter processing may be performed to remove noise. For example, moving average processing utilizing preceding and subsequent data may be applied.

In this embodiment, the output unit 22 acquires data of the optical sensor 21 by an integration method. The integration method excellent in S/N may improve measurement accuracy. In contrast, the integration method has a disadvantage that this cannot increase a data acquisition speed as in a successive method, but this is not problematic at all in this embodiment for the following reason. Therefore, the integration method is comprehensively more suitable than the successive method.

Note that, a case where the optical measuring device 1 is formed of the measuring head 2 and the data processing device 3 is described in this embodiment, but the optical measuring device 1 may have a stand-alone configuration in which the measuring head 2 and the data processing device 3 are provided in the same device.

Necessity of High-Speed Sampling

A frequency response of an eye (TCSF) has little sensitivity in a high frequency range. Therefore, even if a light emission waveform of the measurement target 100 is of high speed and high frequency, such a high speed property that the light emission waveform (shape) may be faithfully acquired is not required in flicker measurement.

In consideration of a load at an operation step to be described later, the number of data is suitably smaller, so that the data acquisition speed does not need to be faster than necessary. An unnecessary increase in speed causes a decrease in amount of incident light and an increase in circuit noise, leading to deterioration in S/N and deterioration in measurement accuracy.

An example of the data acquisition speed is described below. In recent years, high-speed control displays of Vsync 240 Hz and the like have been released. In a case where this is driven by PWM drive, high-speed data acquisition at about 24 kHz (100 data per cycle) at least is required for waveform acquisition (shape acquisition). With a conventional Vsync 60 Hz display, high-speed data acquisition at 6 kHz at least is required. However, in the flicker measurement, from the above-described viewpoint, there is no problem at all at 6 kHz or lower, and this is rather suitable.

In this embodiment, in view of the above, the data is acquired at 1.5 kHz. Note that, the data acquisition speed may be changed according to the measurement target 100, a driving condition and the like. For example, in a case where the driving condition is amplitude modulation drive, this is set to a low speed, and in a case where the drive condition is PWM modulation drive, this is set to a high speed.

In the data acquisition method by the successive method, in a case where the data is acquired at a high speed exceeding 6 kHz, operation processing may be directly performed, or thinning or averaging may be performed in order to reduce the number of data to be handled.

Regarding Response Storage Unit that Stores Impulse Response Characteristic

The data processing device 3 is provided with the response storage unit 31, and the response storage unit 31 stores an impulse response characteristic corresponding to a luminous stimulus response.

Figure 2:
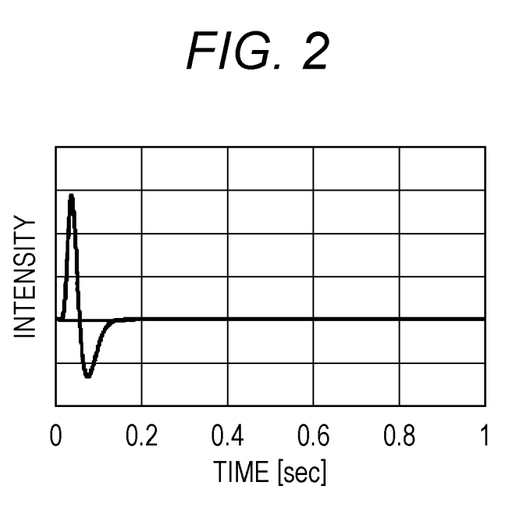
FIG. 2 is a waveform diagram illustrating an example of an impulse response characteristic corresponding to a luminous stimulus response.

An example of the impulse response characteristic corresponding to the luminous stimulus response is illustrated in FIG. 2. A time until a response (reaction) of the eye converges is sufficient for a response period to be stored. The response of the eye generally converges in 0.5 seconds.

The luminous stimulus response, which is a sensory characteristic, greatly depends on an individual (individual), an environment, and the measurement target 100. Therefore, a plurality of impulse response characteristics may be stored in the response storage unit 31, and the impulse response characteristics may be property used according to conditions. It is possible that a user may store (register) the impulse response characteristic in the response storage unit 31.

Examples of parameters on which the luminous stimulus response depends include a measurement area of the stimulus value acquisition unit 20, luminance, color, sex, age, ambient luminance, individual and the like. The impulse response characteristic may be manually selected by the user, or may be automatically selected by the optical measuring device 1. For example, in a case where colors are property used as parameters, automatic selection may be implemented by utilizing the stimulus value acquired for the flicker measurement. As another example, it is possible to provide a sensor on the optical measuring device 1 and automatically switch.

Note that, it is possible that the response storage unit 31 is not built in the data processing device 3, and is located outside. In this case, the impulse response data may be acquired from an external response storage unit 31 to be processed.

Regarding Digital Filter Processing

Digital filter processing by the digital filter processing unit 32 is executed by a processor such as a CPU provided on the data processing device 3 operating according to an operation program stored in a ROM and the like and loaded on a RAM.

The digital filter processing unit 32 receives the continuous data of the stimulus value intensity acquired by the stimulus value acquisition unit 20 and acquires the impulse response characteristic from the response storage unit 31, performs the digital filter processing on the received continuous data of the stimulus value intensity by the acquired impulse response characteristic, and generates data on which the luminous stimulus response is superimposed (also referred to as superimposed stimulus value data in the following description).

In order to perform the digital filter processing, the stimulus value data corresponding to an impulse response period is at least required. A head of the superimposed stimulus value data to be generated starts after the response period, and a period before the same becomes an invalid period due to data missing. In order to reduce this missing data period, in this embodiment, the impulse response period is set to 0.5 seconds or shorter in which the eye response converges. The digital filter processing is performed using only the response of 0.5 seconds or shorter.

A timing at which the digital filter processing is performed is not limited; this may be after the acquisition of the continuous stimulus value is completed, or the acquired stimulus value may be sequentially processed even when the acquisition of all the data is not completed.

Generation of Superimposed Stimulus Value Data and Flicker Index Derivation

As described above, the digital filter processing unit 32 generates and outputs the data on which the luminous stimulus response is superimposed. The flicker index derivation unit 33 derives the index of the flicker using the superimposed stimulus value data. Flicker index derivation processing by the flicker index derivation unit 33 is also executed by the processor of the data processing device 3 operating according to the operation program.

The flicker index derivation is exemplified below.

In a case where the flicker intensity is static such as in a case where the light emission waveform is a cyclic waveform, it is suitable to derive (maximum value (Max)−minimum value (Min)/average value (Ave)) for an entire time region of the superimposed stimulus value data and use the same as an index value. More suitably, when a time range in which the index value is derived may be set to a synchronized condition, that is, an integral multiple of a light emission cycle, a measurement error decreases. Note that, there is a method of using an external synchronization signal, a method in which the user inputs a synchronization frequency and the like as a manner of taking synchronization, but there is no limitation.

In contrast, there is a case where a Vsync frequency is randomly switched in a VRR display. For example, in order to save power, there is a mobile device that is driven at a low speed for still image display and is driven at 60 Hz when a moving image is displayed or a screen is touched. In this manner, in a case where the flicker intensity fluctuates, it is suitable to generate a temporal change in flicker intensity.

Specifically, for the superimposed stimulus value data, (Max−Min)/Ave is derived with a constant time width at each time, and a temporal change in index value is generated. By using this temporal change data, it is possible to easily observe how much and in what situation the flicker intensity fluctuates. Note that, the time width is desirably an integral multiple of the Vynsc cycle.

Figure 3A:
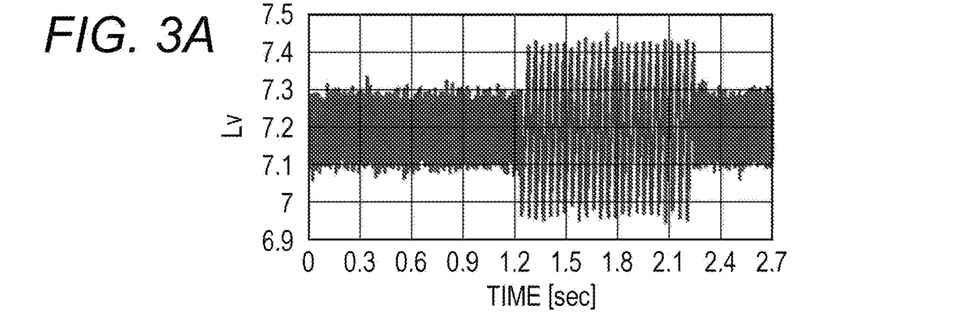
FIGS. 3A to 3D are views for illustrating a measurement result of a light emission waveform acquired by modeling a VRR display as a measurement target.

FIGS. 3A to 3D illustrate a measurement result of the light emission waveform acquired by modeling the VRR display as the measurement target 100. FIG. 3A illustrates the continuous data of the stimulus value intensity acquired for the display. In this display, a drive frequency changes from 60 Hz to 24 Hz then to 60 Hz. There is no gradation change. A frequency of the continuous data of the stimulus value intensity changes according to the change in drive frequency.

Figure 3B:
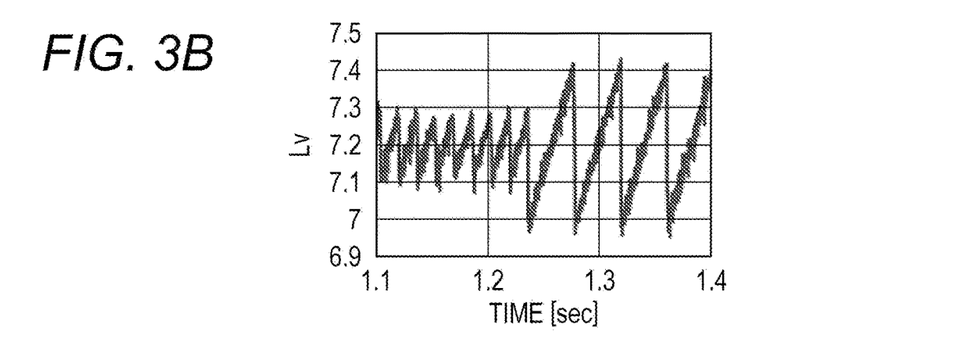
Figure 3C:
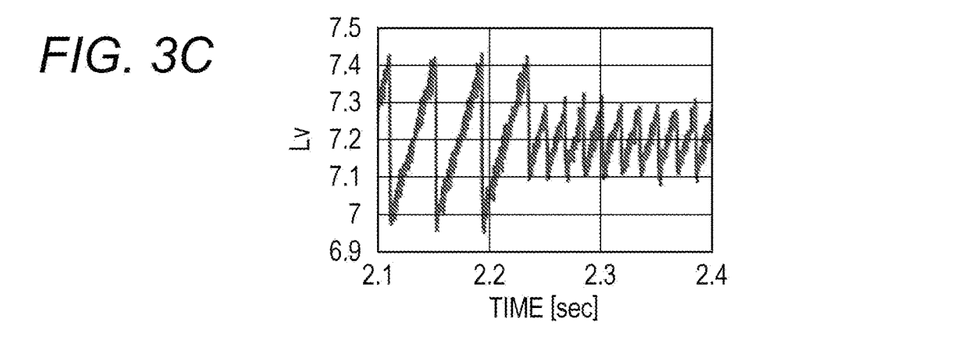

FIG. 3B is an enlarged view illustrating time in the vicinity of a timing at which the drive frequency changes from 60 Hz to 24 Hz, and FIG. 3C is an enlarged view illustrating time in the vicinity of a timing at which the drive frequency changes from 24 Hz to 60 Hz.

Figure 3D:
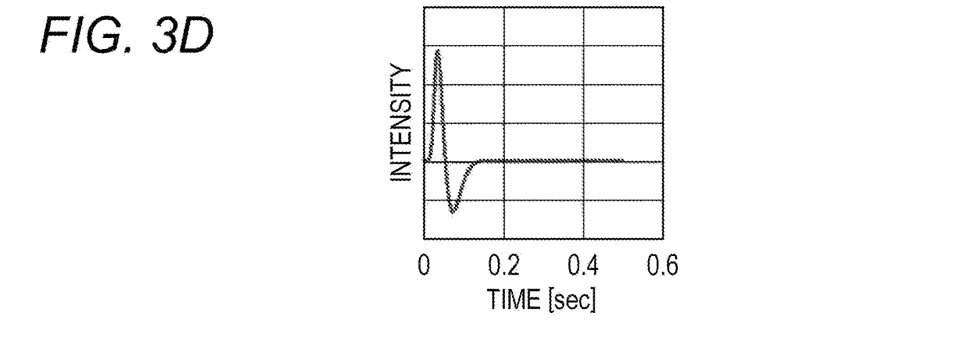

FIG. 3D is a waveform diagram of the impulse response used for the digital filter processing. The impulse response period is set to 0.5 seconds or shorter.

Figure 4A:
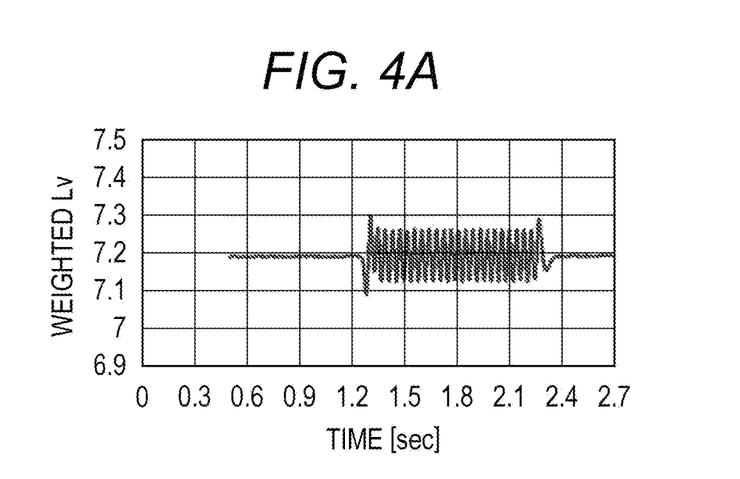
FIG. 4A is a waveform diagram of data on which a stimulus value is superimposed acquired by digital filter processing.

FIG. 4A illustrates the superimposed stimulus value data acquired by the digital filter processing. It is obvious that no waveform distortion occurs.

Figure 4B:
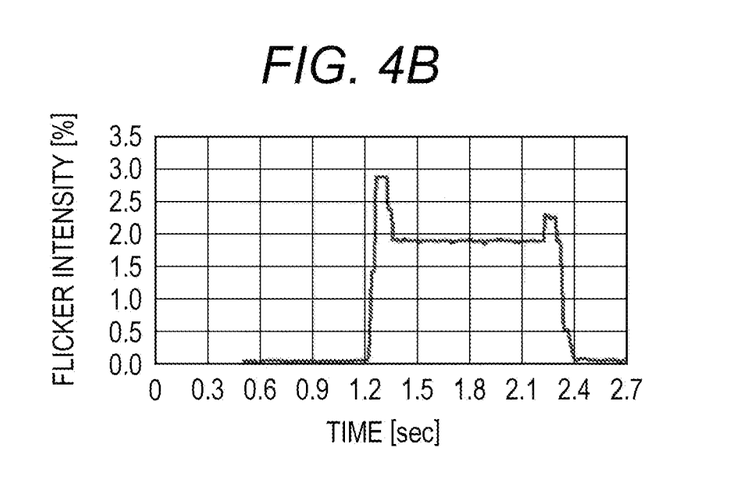
FIG. 4B is a graph illustrating fluctuation in flicker intensity.

FIG. 4B is a graph illustrating the fluctuation in the flicker intensity. Derivation time of the flicker index value is set to 12 Hz.

Note that, the flicker index derivation is not limited to the above-described method, and a method of deriving by an index of another method, for example, an area ratio (flicker index by IES method) may be used.

As described above, in this embodiment, the intensity corresponding to the stimulus value is continuously acquired at a regular time interval, the digital filter processing is performed on the continuous data of the acquired stimulus value intensity by the impulse response characteristic acquired from the response storage unit 31, and the data on which the luminous stimulus response is superimposed is generated. Therefore, although the generated superimposed stimulus value data is data of the stimulus value in consideration of the time response of the eye, the data is not subjected to digital Fourier transform, so that waveform distortion does not occur, and thus, it is possible to measure the flicker excellently on the basis of the superimposed stimulus value data. Furthermore, since it is not necessary to delete a part of the waveform in order to remove the distortion, it is also possible to cope with the measurement target 100 having an aperiodic light emission waveform.

Second Embodiment

In this embodiment, an impulse response is acquired by a method utilizing TCSF.

Configuration of Optical Measuring Device

Figure 5:
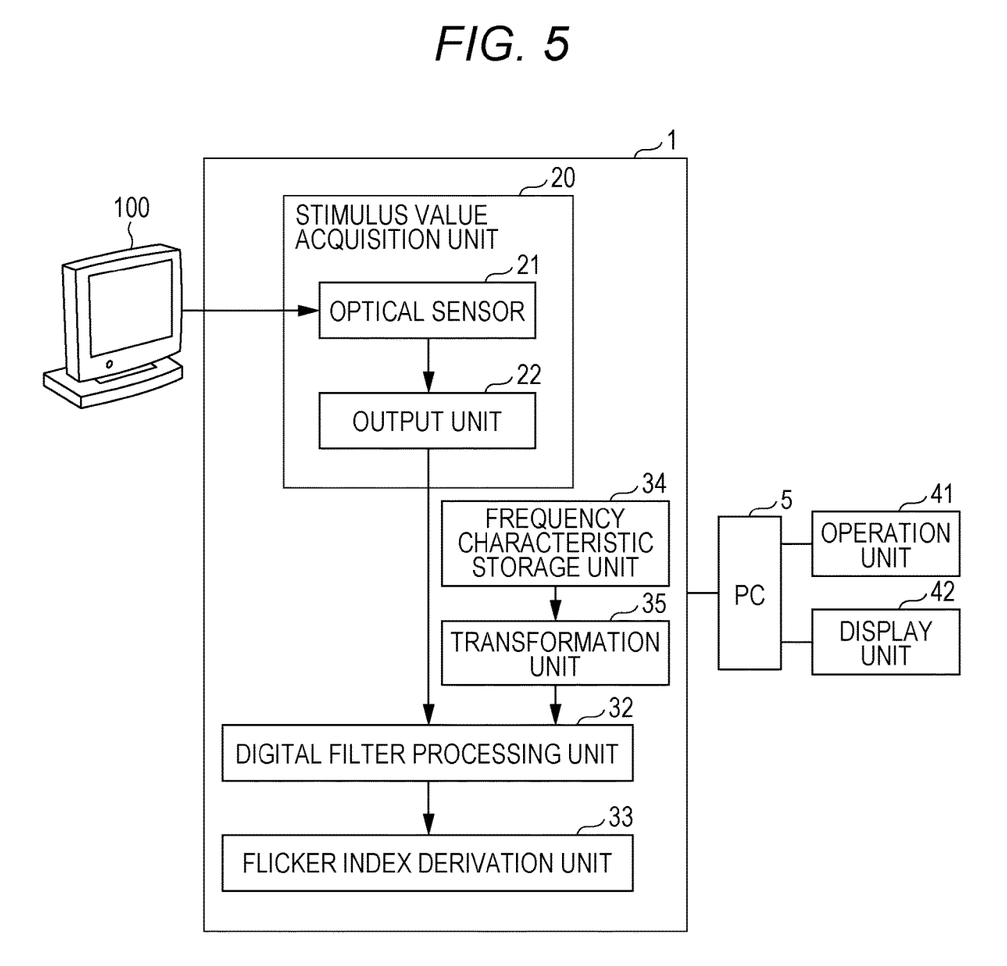
FIG. 5 is a block diagram illustrating a functional configuration of an optical measuring device according to another embodiment of the present invention.

FIG. 5 is a block diagram illustrating a functional configuration of an optical measuring device 1 according to a second embodiment of the present invention. As illustrated in FIG. 5, the optical measuring device 1 is provided with a stimulus value acquisition unit 20, a frequency characteristic storage unit 34, a transformation unit 35, a digital filter processing unit 32, and a flicker index derivation unit 33.

The stimulus value acquisition unit 20 has the same configuration as that of the stimulus value acquisition unit 20 of the first embodiment, and has a function of continuously acquiring an output of an optical sensor 21 at a regular time interval by an output unit 22 and transforming the same into continuous data of stimulus value intensity.

A characteristic of an eye has been widely studied and many TCSFs have been reported for a time response. For example, Document "De Lange, H. Journal of the Optical Society of America, 1958 48, 777-785" describes a difference for each brightness.

In order to utilize such research results, in this embodiment, a frequency characteristic of the eye such as TCSF is stored in the frequency characteristic storage unit 34. The transformation unit 35 transforms the frequency characteristic into an impulse response characteristic corresponding to a luminous stimulus response by performing inverse Fourier transform processing.

Figure 6A:
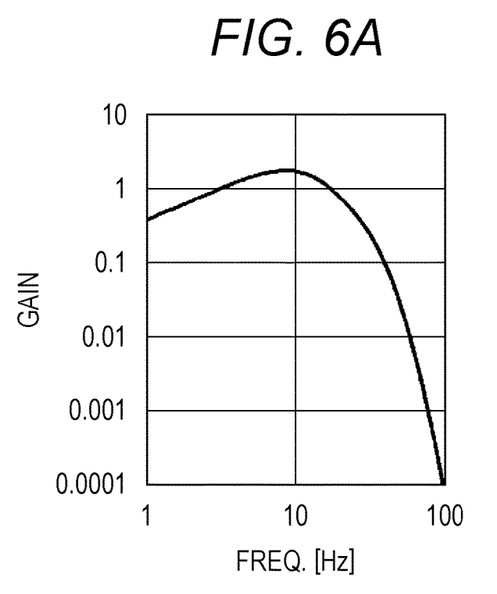
FIG. 6A is a graph illustrating a sensitivity characteristic in a frequency characteristic of an eye.

In the TCSF used in the IEC standard and the like disclosed in the conventional art, only sensitivity data as illustrated in FIG. 6A among the frequency characteristics of the eye is expressed. However, in order to make the transformation into the impulse response characteristic accurate, it is desirable that phase data is included in the frequency characteristic. Therefore, in this embodiment, the frequency characteristic including a phase characteristic is stored in the frequency characteristic storage unit 34.

Figure 6B:
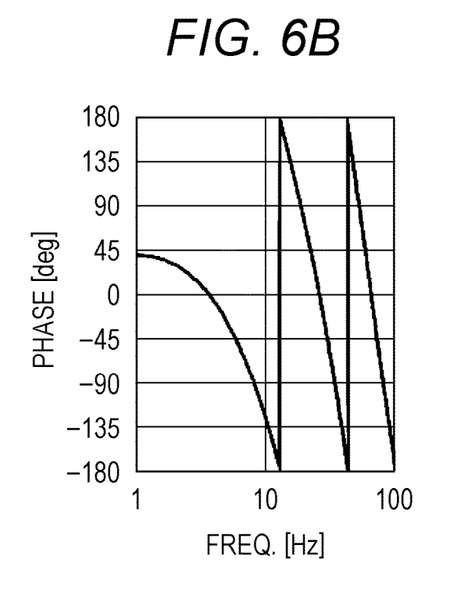
FIG. 6B is a graph illustrating an example of the frequency characteristic of the eye including a phase characteristic.

FIG. 6B illustrates an example of the frequency characteristic of the eye including the phase characteristic. As in the first embodiment, a plurality of frequency characteristics of the eye may be stored in the frequency characteristic storage unit 34, and the frequency characteristics may be properly used according to conditions. It is possible that the user may store (register) the frequency characteristic of the eye in the frequency characteristic storage unit 34, or any frequency characteristic may be automatically selected.

The digital filter processing unit 32 performs digital filter processing on the continuous data of the stimulus value intensity acquired by the stimulus value acquisition unit 20 by the impulse response characteristic transformed from the frequency characteristic of the eye by the transformation unit 35 to generate superimposed stimulus value data. The same operation as that of the digital filter processing unit 32 in the first embodiment is performed except that the impulse response characteristic is generated by the transformation unit 35.

Note that, time data of the impulse response characteristic generated by the transformation unit 35 is often sufficiently longer than the response period of the eye (about 0.5 seconds). For example, in a case of data storage of the frequency characteristic in increments of 0.1 Hz, the data of the impulse response characteristic generated by the inverse Fourier transform is of 10 seconds.

In the digital filter processing, as described in the first embodiment, the impulse response period is directly related to a length of the invalid period of the superimposed stimulus value data. Therefore, also in this embodiment, in order to suppress the invalid period, it is desirable to use only 0.5 seconds or shorter at a head of the transformed and generated impulse response characteristic for the digital filter processing.

As in the first embodiment, the flicker index derivation unit 33 derives a flicker index value from the superimposed stimulus value data.

The optical measuring device 1 illustrated in FIG. 5 receives a measurement command from a personal computer (PC) 5 and transmits a measurement result to the PC. The measurement result includes the superimposed stimulus value data and the flicker index value.

Note that, in the configuration of the optical measuring device 1 of the second embodiment illustrated in FIG. 5, the frequency characteristic storage unit 34, the transformation unit 35, the digital filter processing unit 32, and the flicker index derivation unit 33 may be provided in the PC 5 as a data processing device as in the first embodiment, and a processor in the PC 5 may operate according to an operation program to perform the transformation processing of the frequency characteristic of the eye into the impulse response, the generation of the superimposed stimulus value data by the digital filter processing, the derivation of the flicker index value and the like.

Alternatively, with the configuration of the optical measuring device 1 illustrated in FIG. 5, the frequency characteristic storage unit 34, the transformation unit 35, the digital filter processing unit 32, and the flicker index derivation unit 33 may be provided in the PC 5.

It is possible that the frequency characteristic storage unit 34 is not built in the optical measuring device 1, and is present outside. In this case, the frequency characteristic may be acquired from an external frequency characteristic storage unit 34 and processed.

Third Embodiment

The optical measuring device 1 according to the first embodiment illustrated in FIG. 1 and the optical measuring device 1 according to the second embodiment illustrated in FIG. 5 may have a function capable of performing convolution of TCSF based on a conventional method defined in the IEC standard "62341-6-3". In a case of this conventional measuring method, since a convolution operation of the TCSF is performed on a frequency space, discrete Fourier transform (DFT) processing or inverse Fourier transform (iDFT) processing is required. Therefore, in order to also have the function of the conventional method, in a case of the optical measuring device 1 of the first embodiment, a discrete Fourier transform (DFT) means and an inverse Fourier transform (iDFT) means are required. In a case of the second embodiment, since the inverse Fourier transform (iDFT) may be performed by the transformation unit 35, the discrete Fourier transform (DFT) means is required.

Note that, it is not required to switch from the measuring method of this embodiment to perform the conventional measuring method, and the data acquired by the stimulus value acquisition unit 20 may be shared to enable simultaneous measurement.

However, since the conventional measuring method has an advantage that the invalid period does not occur, in a case where synchronous measurement is performed on the light emission waveform having periodicity, this is advantageous because the measurement time may be shortened while ensuring the measurement accuracy. In contrast, the measuring method of this embodiment may implement the flicker measurement with a high degree of freedom with respect to a measurement condition and the light emission waveform as described above. By mounting both the measuring methods, they may be used properly according to the purpose, and convenience is increased.

Although embodiments of the present invention have been described and illustrated in detail, the disclosed embodiments are made for purposes of illustration and example only and not limitation. The scope of the present invention should be interpreted by terms of the appended claims.

What is claimed is:

1. An optical measuring device comprising:
   a stimulus value acquirer that receives light from a measurement target and continuously acquires intensity corresponding to a stimulus value at a regular time interval;
   a response characteristic acquirer that acquires an impulse response characteristic from a storage that stores the impulse response characteristic corresponding to a luminous stimulus response; and
   a hardware processor that
      performs digital filter processing on continuous data of stimulus value intensity acquired by the stimulus value acquirer by the impulse response characteristic acquired by the response characteristic acquirer to generate data on which the luminous stimulus response is superimposed; and
      derives a flicker index based on the data on which the luminous stimulus response is superimposed.

2. The optical measuring device according to claim 1, wherein an impulse response in the impulse response characteristic is in 0.5 seconds or shorter.

3. The optical measuring device according to claim 1, wherein the hardware processor derives a flicker index in a time shorter than a measurement time length at a plurality of times of the data generated by the hardware processor.

4. The optical measuring device according to claim 1, wherein the regular time interval when the stimulus value acquirer acquires the intensity corresponding to the stimulus value is a time interval of 6 kHz or shorter.

5. The optical measuring device according to claim 1, wherein the stimulus value acquirer acquires the intensity corresponding to the stimulus value by an integration method.

6. The optical measuring device according to claim 1, wherein there is a plurality of impulse response characteristics.

7. The optical measuring device according to claim 1, comprising: at least a Fourier transformer, wherein flicker measurement using the Fourier transformer is also possible.

8. An optical measuring device comprising:
   a stimulus value acquirer that receives light from a measurement target and continuously acquires intensity corresponding to a stimulus value at a regular time interval;
   a transformer that transforms a frequency characteristic of an eye stored in a storage into an impulse response characteristic corresponding to a luminous stimulus response; and
   a hardware processor that
      performs digital filter processing on continuous data of stimulus value intensity acquired by the stimulus value acquirer by the impulse response characteristic transformed by the transformer to generate data on which the luminous stimulus response is superimposed; and
      derives a flicker index based on the data on which the luminous stimulus response is superimposed.

9. The optical measuring device according to claim 8, wherein the hardware processor derives a flicker index in a time shorter than a measurement time length at a plurality of times of the data generated by the hardware processor.

10. The optical measuring device according to claim 8, wherein the regular time interval when the stimulus value acquirer acquires the intensity corresponding to the stimulus value is a time interval of 6 kHz or shorter.

11. The optical measuring device according to claim 8, wherein the stimulus value acquirer acquires the intensity corresponding to the stimulus value by an integration method.

12. The optical measuring device according to claim 8, wherein there is a plurality of impulse response characteristics.

13. The optical measuring device according to claim 8, comprising: at least a Fourier transformer, wherein flicker measurement using the Fourier transformer is also possible.

14. The optical measuring device according to claim 8, wherein an impulse response in the impulse response characteristic is in 0.5 seconds or shorter.

15. The optical measuring device according to claim 14, wherein the frequency characteristic includes a phase characteristic.

16. An optical measuring method comprising:
   receiving light from a measurement target and continuously acquiring intensity corresponding to a stimulus value at a regular time interval;

acquiring an impulse response characteristic from a storage that stores the impulse response characteristic corresponding to a luminous stimulus response;
performing digital filter processing on continuous data of stimulus value intensity acquired by the stimulus value acquiring by the impulse response characteristic acquired by the response characteristic acquiring to generate data on which the luminous stimulus response is superimposed; and
deriving a flicker index based on the data on which the luminous stimulus response is superimposed.

17. The optical measuring method according to claim 16, wherein an impulse response in the impulse response characteristic is in 0.5 seconds or shorter.

18. The optical measuring method according to claim 16, further comprising: deriving a flicker index in a time shorter than a measurement time length at a plurality of times of the data generated by the digital filter processing.

19. An optical measuring method comprising:
receiving light from a measurement target and continuously acquiring intensity corresponding to a stimulus value at a regular time interval;
transforming a frequency characteristic of an eye stored in a storage into an impulse response characteristic corresponding to a luminous stimulus response; and
performing digital filter processing on continuous data of stimulus value intensity acquired by the stimulus value acquiring by the impulse response characteristic transformed by the transforming to generate data on which the luminous stimulus response is superimposed; and
deriving a flicker index based on the data on which the luminous stimulus response is superimposed.

20. The optical measuring method according to claim 19, wherein an impulse response in the impulse response characteristic is in 0.5 seconds or shorter.

21. The optical measuring method according to claim 19, further comprising: deriving a flicker index in a time shorter than a measurement time length at a plurality of times of the data generated by the digital filter processing.

22. A data processing device comprising:
a receiver that receives continuous data of stimulus value intensity acquired by receiving light from a measurement target and continuously acquiring intensity corresponding to a stimulus value at a regular time interval;
a response characteristic acquirer that acquires an impulse response characteristic from a storage that stores the impulse response characteristic corresponding to a luminous stimulus response; and
a hardware processor that
performs digital filter processing on the continuous data of stimulus value intensity acquired by the receiver by the impulse response characteristic acquired by the response characteristic acquirer to generate data on which the luminous stimulus response is superimposed; and
derives a flicker index based on the data on which the luminous stimulus response is superimposed.

23. The data processing device according to claim 22, wherein an impulse response in the impulse response characteristic is in 0.5 seconds or shorter.

24. The data processing device according to claim 22, wherein the hardware processor derives a flicker index in a time shorter than a measurement time length at a plurality of times of the data generated by the hardware processor.

25. A data processing device comprising:
a receiver that receives continuous data of stimulus value intensity acquired by receiving light from a measurement target and continuously acquiring intensity corresponding to a stimulus value at a regular time interval;
a transformer that transforms a frequency characteristic of an eye stored in a storage into an impulse response characteristic corresponding to a luminous stimulus response; and
a hardware processor that
performs digital filter processing on the continuous data of stimulus value intensity acquired by the receiver by the impulse response characteristic transformed by the transformer to generate data on which the luminous stimulus response is superimposed; and
derives a flicker index based on the data on which the luminous stimulus response is superimposed.

26. The data processing device according to claim 25, wherein an impulse response in the impulse response characteristic is in 0.5 seconds or shorter.

27. The data processing device according to claim 25, wherein the hardware processor derives a flicker index in a time shorter than a measurement time length at a plurality of times of the data generated by the hardware processor.

28. A non-transitory recording medium storing a computer readable program causing a computer to execute:
receiving continuous data of stimulus value intensity acquired by receiving light from a measurement target and continuously acquiring intensity corresponding to a stimulus value at a regular time interval;
acquiring an impulse response characteristic from a storage that stores the impulse response characteristic corresponding to a luminous stimulus response;
performing digital filter processing on the continuous data of stimulus value intensity received by the receiving by the impulse response characteristic acquired by the response characteristic acquiring to generate data on which the luminous stimulus response is superimposed; and
deriving a flicker index based on the data on which the luminous stimulus response is superimposed.

29. The non-transitory recording medium storing a computer readable program according to claim 28, wherein an impulse response in the impulse response characteristic is in 0.5 seconds or shorter.

30. The non-transitory recording medium storing a computer readable program according to claim 28, causing the computer to further execute: deriving a flicker index in a time shorter than a measurement time length at a plurality of times of the data generated by the digital filter processing.

31. A non-transitory recording medium storing a computer readable program causing a computer to execute:
receiving continuous data of stimulus value intensity acquired by receiving light from a measurement target and continuously acquiring intensity corresponding to a stimulus value at a regular time interval;
transforming a frequency characteristic of an eye stored in a storage into an impulse response characteristic corresponding to a luminous stimulus response; and
performing digital filter processing on the continuous data of stimulus value intensity received by the receiving by the impulse response characteristic transformed by the transforming to generate data on which the luminous stimulus response is superimposed; and
deriving a flicker index based on the data on which the luminous stimulus response is superimposed.

32. The non-transitory recording medium storing a computer readable program according to claim 31, wherein an impulse response in the impulse response characteristic is in 0.5 seconds or shorter.

33. The non-transitory recording medium storing a computer readable program according to claim 31, causing the computer to further execute: deriving a flicker index in a time shorter than a measurement time length at a plurality of times of the data generated by the digital filter processing.

* * * * *